US007180517B2

(12) United States Patent
Haynes

(10) Patent No.: US 7,180,517 B2
(45) Date of Patent: Feb. 20, 2007

(54) QUALITY OF SERVICE TERRAIN MAP FOR UTILITIES

(75) Inventor: David Donald Haynes, O'Fallon, MO (US)

(73) Assignee: Distribution Control Systems, Inc., Hazelwood, MO (US)

( * ) Notice: Subject to any disclaimer, the term of this patent is extended or adjusted under 35 U.S.C. 154(b) by 45 days.

(21) Appl. No.: 10/645,468

(22) Filed: Aug. 21, 2003

(65) Prior Publication Data

US 2005/0041026 A1 Feb. 24, 2005

(51) Int. Cl.
*G06T 11/20* (2006.01)
*G06F 11/30* (2006.01)

(52) U.S. Cl. .............. 345/440.1; 702/61; 702/182; 702/184; 702/185

(58) Field of Classification Search ........... 345/440, 345/440.2, 618, 440.1; 702/61, 182, 184, 702/185
See application file for complete search history.

(56) References Cited

U.S. PATENT DOCUMENTS

| 5,486,805 | A |   | 1/1996  | Mak             |           |
|-----------|---|---|---------|-----------------|-----------|
| 5,625,751 | A |   | 4/1997  | Brandwajn et al.|           |
| 6,021,402 | A |   | 2/2000  | Takriti         |           |
| 6,026,145 | A | * | 2/2000  | Bauer et al.    | 379/22.03 |
| 6,486,899 | B1| * | 11/2002 | Bush, Jr.       | 715/855   |

| 2004/0021687 | A1 | * | 2/2004 | Wobben |
|--------------|----|----|--------|--------|

FOREIGN PATENT DOCUMENTS

| EP | 0853368 | 8/1998 |
| FR | 2745435 | 8/1997 |
| WO | 0133693 | 5/2001 |

OTHER PUBLICATIONS

Real-TIme Monitoring of the TVA Power Systems; T.W. Cease and Butch Feldhaus, Computer Applications in Power, IEEE, vol. 7, Issue: 3, Jul. 1994 pp. 47-51.*
Reisner, Trudi; "Sams Teach Yourself Microsoft Excel 2000 in 24 Hours"; 1999; Indianapolis, Ind. Sams Publishing (Electronic reproduction. Boulder, Colo. : NetLibrary, 2000); pp. 222-225.*

(Continued)

*Primary Examiner*—Kee M. Tung
*Assistant Examiner*—Michelle K. Lay
(74) *Attorney, Agent, or Firm*—Polster, Lieder, Woodruff & Lucchesi, L.C.

(57) ABSTRACT

A method of providing a graphic display (SD) of an electrical distribution network (N) to provide network personnel insight as to network operation comprising. A segment of the network is monitored to obtain information about predetermined types of incidents which occur. The information is then processed to ascertain where the incidents occurred and the number of incidents which occur over a predetermined period of time. The results are presented in a graphical display which includes the number of incidents occurring at each location within the network segment, and the number of incidents which occurred at each location during previous period of time at the respective locations.

27 Claims, 5 Drawing Sheets

OTHER PUBLICATIONS

Haddad, Alexandria; "Sams Teach Yourself Microsoft PowerPoint 2000 in 10 Minutes"; 1999; Indianapolis, Ind. : Sams (Electronic reproduction. Boulder, Colo. : NetLibrary, 2000); pp. 148 and 173.*

The Value of LAN/WAN Based Operational Data Disply Systems J.H. Malinowski & J.W. Ballance, Aug. 95.

Real-Time Monitoring of the TVA Power Systems T.W. Cease and Butch Feldhaus, Jul. 1994.

Object-oriented design of trouble call analysis system on personal computer Z.L. Gaing, C.N. Lu and Y.T. Lin, Mar. 1995.

Using Control Center Technology to Solve New Utility Challenges Raymond L. Vice, James T. Wood, Khai D. Le, and Mai T. Nguyen, Oct. 1994.

Enhancing the Human-Computer Interface of Power System Applications Gilberto Pires de Azevedo, May 1996.

Verfahren zur Anzeige des Betriebsverhaltens von Anlagen, PCT/EP01/10387.

* cited by examiner

QUALITY OF SERVICE TERRAIN MAP FOR UTILITIES

CROSS REFERENCE TO RELATED APPLICATIONS

None

STATEMENT REGARDING FEDERALLY SPONSORED RESEARCH OR DEVELOPMENT

N/A

BACKGROUND OF THE INVENTION

This invention relates to the collection and presentation of information by utilities such as electrical utilities and more particularly, to a quality of service terrain map for graphically displaying current and historical data related to a power distribution network so to improve customer service.

Electrical utilities maintain power distribution networks to provide electricity to their customers. The network comprises, for example, a power generating station, sub-stations to which the power is routed from a generating site to customers' homes, factories, or buildings, and the necessary infrastructure. While electrical power distribution generally runs smoothly, outages caused by various reasons, "brown outs", and other problems do occur.

To provide good customer service requires that the utility be able to monitor the power distribution network to determine when and where outages or other problems occur, so these can be quickly corrected and customer service restored. Besides monitoring the current status of the network, utilities also maintain historical records on the network. If properly combined with current information, this allows the utility to identify where chronic problems occur so these can be addressed and fixed as well. Using automatic meter readers (AMRs), power monitors located at specific sites, and other instrumentation, and a two-way automated communications system (or TWACS®), momentary power disruptions, inbound and outbound signal strength measurements, first try success rates for different transponder points, and other measurements, a substantial amount of data on the network can be accumulated. Another important input is customer complaints of problems such as outages.

While all of this information is relatively easy to collect, presenting it in a meaningful way presents problems. In particular, it is important to display the information in such a way that system managers can readily detect imminent power failures, for example, so these can either be prevented, or their effects minimized. When a power failure does occur, it is important to know both its size (number of customers effected) and its geographic extent. Merely displaying numbers, or tables of values, as some systems do, is helpful, but not always sufficient. The deficiency with these approaches is that it is difficult to visualize what is taking place throughout the network. For example, the results of a storm may be widespread but of short duration. A tree limb occasionally brushing against a power line, or a dead animal on the power line, or a transformer that sometimes overheats, may produce a localized problem, but one which is prolonged. It is further important that the information be displayed so as to not only provide management with an overview of network operations, but also provide meaningful information to service personnel responsible for maintaining a segment of the networks as to problems within their particular area.

It would be helpful therefore to provide a graphical display that combines both current data from a variety of sources, as well as historical data, to provide management, service personnel, and others, with pertinent information about the network. It is also important to do so in a way that highlights problems areas so they are readily recognized as such and appropriate action can be taken.

BRIEF SUMMARY OF THE INVENTION

The present invention is directed to a graphic display method of displaying quality of service information about an electrical power system. Both current information, obtained from a variety of sources, and historical information about the system are displayed together. The information is displayed in a three-dimensional (3D) terrain map format and provides information for specific sections of the power distribution network. This includes the number of occurrences taking place at each location, both currently, and those which previously occurred. The display can be for one segment of the system; or, information concerning a number (or all) segments of the system is combined to produce an overall system display.

The display can be presented on a computer or television screen, printed out to produce a hard copy, or transmitted by an electronic medium from one user site to another. The display can be modified (e.g., rotated) so the information presented is viewed from different perspectives. This gives users a better understanding of the status of the power distribution system. Notes can be appended to the display to provide the viewer with specific information helpful in determining what is happening within the system. This is helpful for managers to decide what steps, if any, may be needed to fix problems within the system, or what portions of the system may need to be investigated to determine if there are chronic problems which need to be rectified.

Information presented on the displayed is color coded (using a Gray scale) or a range of colors to make it easier to interpret the information presented.

Other objects and features will in part apparent and in part pointed out hereinafter.

BRIEF DESCRIPTION OF THE SEVERAL VIEWS OF THE DRAWINGS

The objects of the invention are achieved as set forth in the illustrative embodiments shown in the drawings which form a part of the specification.

Corresponding reference characters indicate corresponding parts throughout the several views of the drawings.

DETAILED DESCRIPTION OF INVENTION

The following detailed description illustrates the invention by way of example and not by way of limitation. This description will clearly enable one skilled in the art to make and use the invention, and describes several embodiments, adaptations, variations, alternatives and uses of the invention, including what I presently believe is the best mode of carrying out the invention. As various changes could be made in the above constructions without departing from the scope of the invention, it is intended that all matter contained in the above description or shown in the accompanying drawings shall be interpreted as illustrative and not in a limiting sense.

Figure 1A:
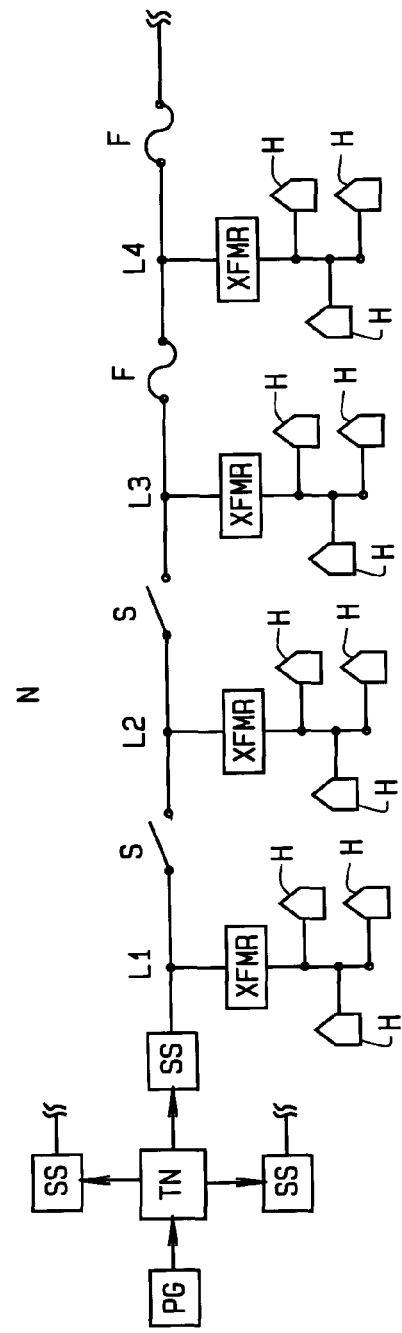
FIG. 1A is a simplified representation of a segment of a power distribution system.
Figure 1B:
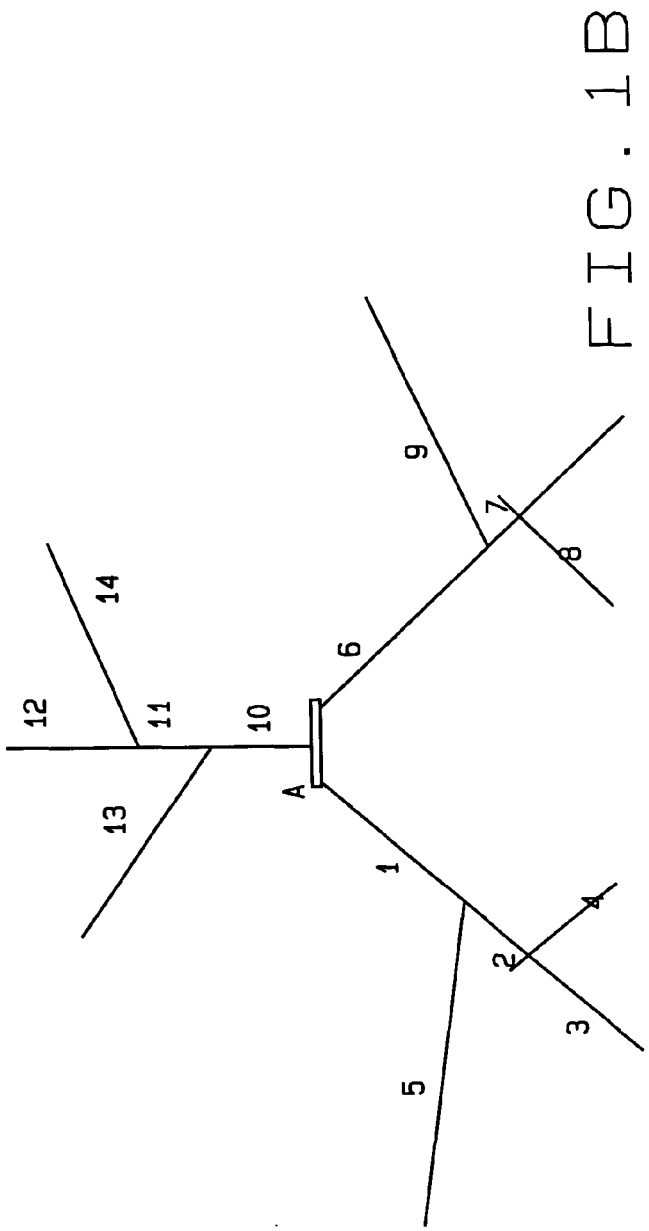
FIG. 1B is a simplified representation of an entire circuit from a given bus.

Referring to the drawings, a power distribution network N is shown in simplified form in FIG. 1A. The network typically includes a power generating station PG. Electricity created at station PG is transmitted through a transmission network TN to one or more electrical substations SS. From each substation, electricity is distributed over a power line L to individual homes, offices, stores, factories, etc., all of which are indicated generally H. Service transformers XFMR step down the distribution voltage, as needed, to each using site H. Protective devices such as electrical switches S and fuses F may be interposed at various points along the distribution path to protect the network. This divides the distribution line into the segments L1–L4 shown in FIG. 1A. In FIG. 1B, a bus A is shown to have a first feeder 1 with branches or laterals 4 and 5. Altogether, the feeder has protective devices which segment it into line sections 1, 2, 3, 4, and 5. A second feeder 6 from bus A comprises line sections 6, 7, 8, and 9; while, a third feeder 10 from the bus includes line sections 11, 12, 13, and 14.

For convenience, each substation and the portion of the distribution network controlled through the substation may be thought of as a segment of the overall power distribution network. To provide a quality of service expected by customers, it is important for management, maintenance and emergency service personnel to monitor network performance. However, the performance characteristics of the network which they monitor may vary. Emergency service personnel, for example, must react to immediate problems such as power outages which shut down service to customers. These people need to restore power as quickly as possible. Maintenance personnel, while they also need to be aware of immediate problems, must also focus on long term problems which, while they do not necessarily cause power outages, effect the quality of service to areas of network N. For example, power fluctuations on a line or line segment over some period of time is indicative of failing equipment and the need to locate and replace the equipment. Or, brief power excursions or outages may indicate a tree limb brushing against the power line on particularly windy days and the need to locate and trim the limb. Management needs to focus on both short range and long term problems, but must also be sensitive to customer complaints. If complaints start being concentrated in one area of the network, these need to be checked against other indications of problems in that area; as well as response time to noted problems and how long it takes to fix a problem.

Information for identifying both a problem and its locale are available. Customer complaints, as noted, are a major source of this information since utilities keep logs of such calls which usually include the time of the call, the customer's location, and the nature of the problem. Many buildings are equipped with automated meter readers or AMRS. Such readers, indicated R1–Rn in FIG. 2, allow remote site reporting of not only electrical usage at a facility, but can also provide information as to voltage levels at the facility, brief power outages (commonly referred to as "blink" counts) and prolonged outages (as evidenced by the lack of a signal from the AMR at a site). Communications to and from facilities in which AMRs are installed can be via a TWACS® communications system as is known in the art. Other sources of information include power monitors PM installed at specific locations that provide information relating to power levels and power usage over land lines, or using RF, or by the internet.

Figure 2:
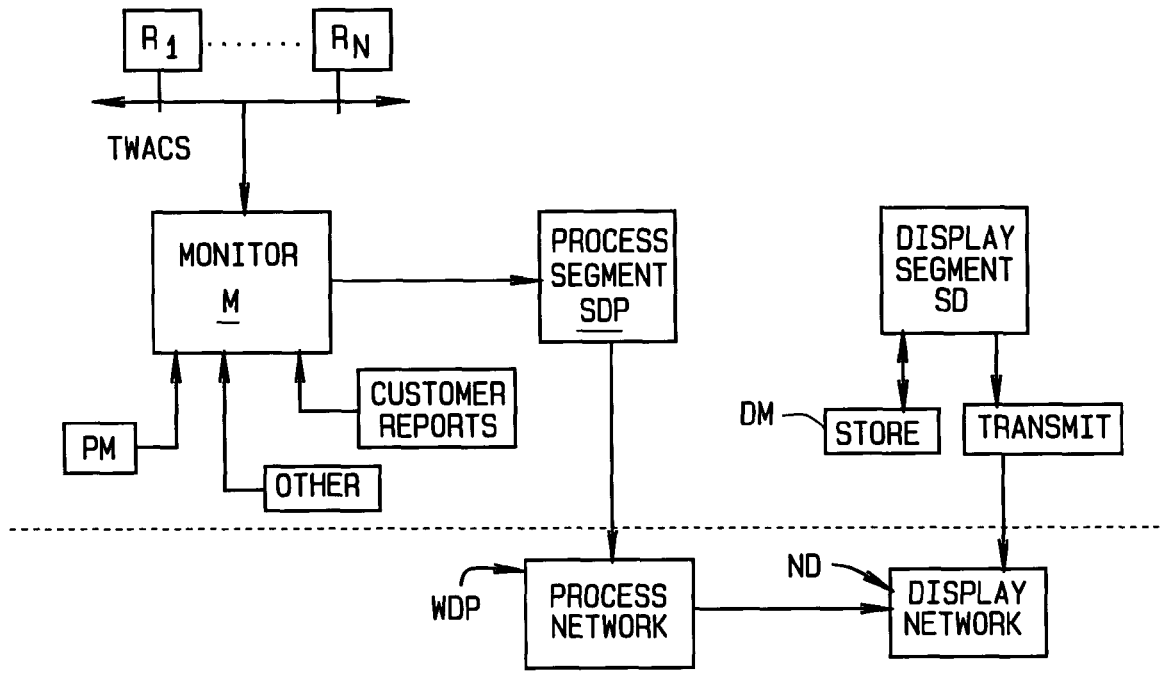
FIG. 2 is a simplified block diagram illustrating the method of the invention.

All of the inputs concerning the particular segment of the network are supplied to monitor M. The monitor collects the information from whatever source it is supplied and provides it to a segment data processor SDP which is also shown in FIG. 2. The data processor now sorts out the data and arranges it by reporting interval, location and type of problem reported. When the processor has completed its work, the results are supplied to a segment display unit SD. Those skilled in the art will appreciate that the reported information is normalized to facilitate comparison with other data from earlier reporting periods, or from other portions of the electrical distribution network.

Figure 3A:
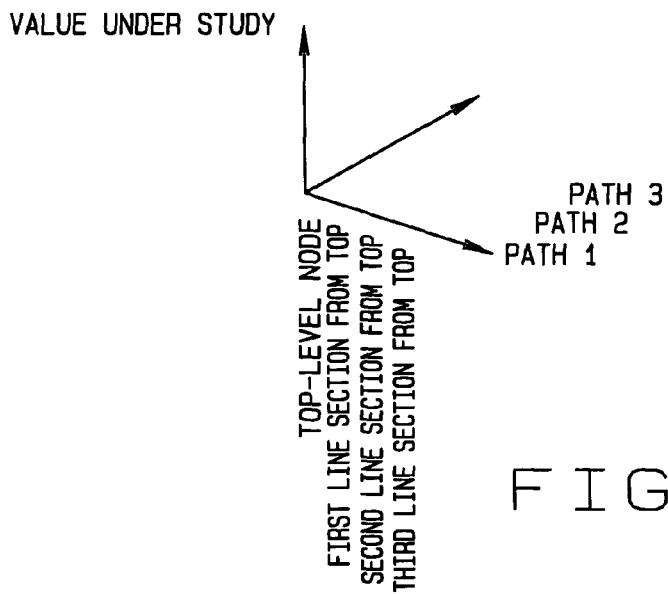
FIG. 3A is a model for a three-dimensional display created using the method of the present invention, an FIG. 3B is an example of such a graphic display.
Figure 3B:
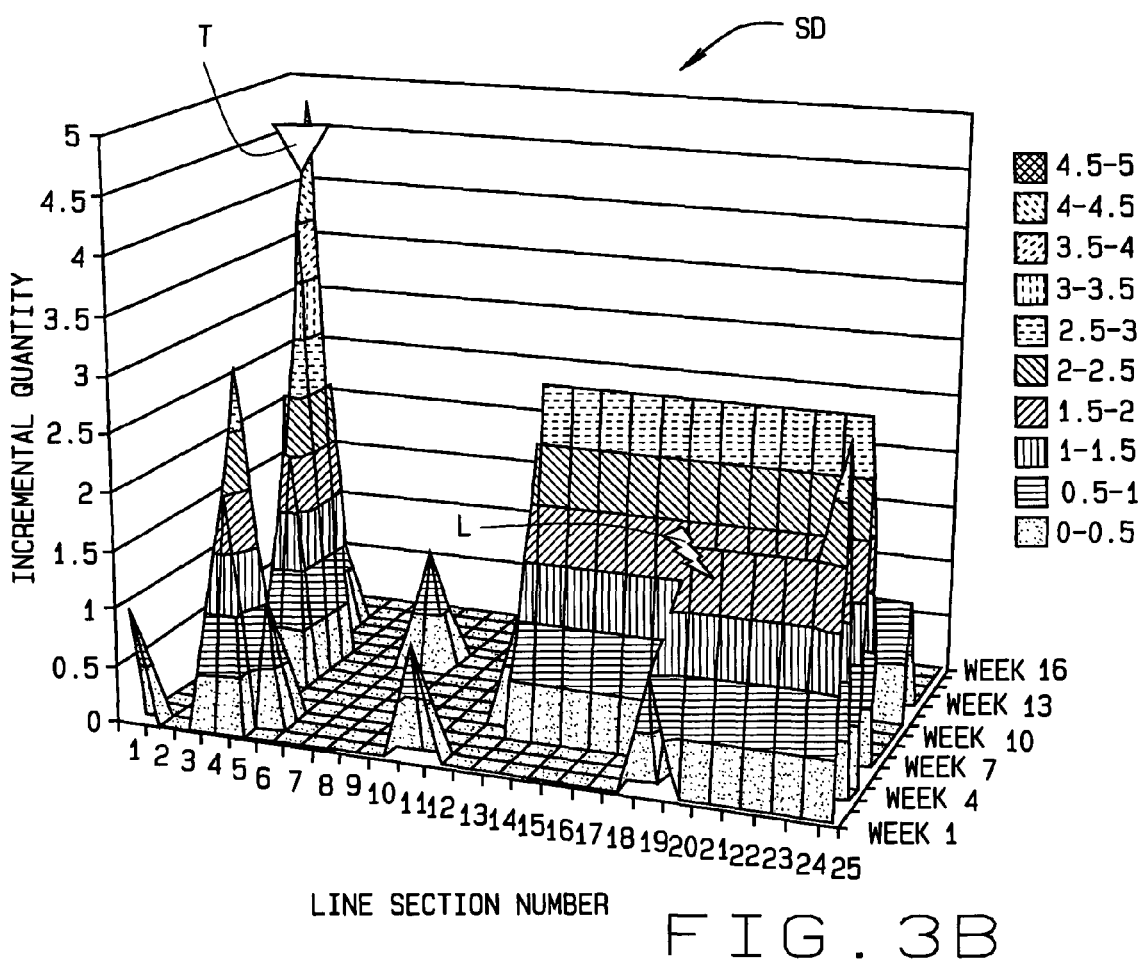

The display unit performs a number of functions. First, it arranges the information into a three dimensional display format such as shown in FIGS. 3A and 3B. This requires the unit to recall, from a data memory DM, relevant information for previous periods of time for the same type of reported problems for the same portion of the network segment. It also updates memory DM with the new information so this information is now stored in the memory for future use. Those skilled in the art will appreciate that the data can be stored in a number of ways including onsite or at a remote location.

Second, the unit presents the 3D display shown in FIGS. 3A and 3B. The display is important because it allows an observer to readily ascertain what is occurring at respective portions within the network segment. The observer can then determine i) whether operations within the network segment are acceptable; or if not, ii) where a problem is occurring, and iii) the magnitude of the problem (short term or long term).

In FIGS. 3A and 3B, the x-axis represents location within the segment of the distribution network. This is, for example, the line section number starting with a top node as indicated in FIG. 3A, then the first line section from the top node, second line section from the top node, etc.

As indicated in FIG. 3A, the y-axis represents the value under study. Depending upon what it is, the value represented on the y-axis can either be a floating point value as shown in FIG. 3B, or an integer value. An example of an integer value is "blink" counts. Examples of the former would signal-to-noise ratios for a TWACS inbound signal strength. When voltages are displayed on the y-axis, it is typically in "per unit" units. For convenience in understanding the display, the display is color coded, as indicated by the chart on the right side of FIG. 3B. Since the display is typically presented on a color computer monitor or television screen, the color coding (whether using a Gray scale or color palette) makes differences in the presentation more readily understandable to observers.

Finally, the z-axis can be for a particular path as indicated in FIG. 3A, or for a predetermined period of time (a week, for example) as indicated in FIG. 3B. If path is represented on the z-axis as in FIG. 3A, then time becomes a $4^{th}$ dimension. In such instance, the user would view the graph as an animated loop comprising a series of similar 3D displays representing different points in time. Now, besides being able to rotate the 3D display as described herein, the user also has the capability to scroll through the loop, moving backward or forward, or pausing at a particular display. This is helpful in allowing the viewer to observe changes over time, particularly problems which slowly increase over time.

An example of the type of information plotted on a display as shown in FIG. 3A would be a sequence of line sections developed from FIG. 1B. From FIG. 1B, the following circuit trails are possible: {A,1,2,3}, {A,1,2,4}, {A,1,5}, {A,6,7}, {A,6,7,8}, {A,6,9}, {A,10,11,12}, {A,10, 13}, {A,10,11,14}. As a practical matter, were one to attempt to combine the data developed for all these various paths from bus A, the data will begin to lose its value because one could combine results from a "weak" end-of-line branch or lateral (2,3,4,5,7,8,9,11,12,13,14) into a "healthy" main feeder line (1,6,10). Using the method of the present invention, a 3D display using the model of FIG. 3A would now be developed in which the paths comprising the z-axis are arranged as follows:

| Path | Sequence |
|---|---|
| 1 | {A, 1, 2, 3} |
| 2 | {A, 1, 2, 4} |
| 3 | {A, 1, 5} |
| 4 | {A, 6, 7} |
| 5 | {A, 6, 7, 8} |
| 6 | {A, 6, 9} |
| 7 | {A, 10, 11, 12} |
| 8 | {A, 10, 11, 14} |
| 9 | {A, 10, 13} |

If the graph is as shown in FIG. 3B, where the z-axis represents time, those skilled in the art will understand that the time interval could be longer (a month) or shorter (a day or hour) than the weekly interval shown without departing from the scope of the invention.

The display presented by unit SD has other features as well. For example, the display can be rotated so to present different perspectives of the terrain map represented by the display. This allows people interested in various aspects of network operations to readily ascertain information pertinent to their responsibilities.

Figure 5A:
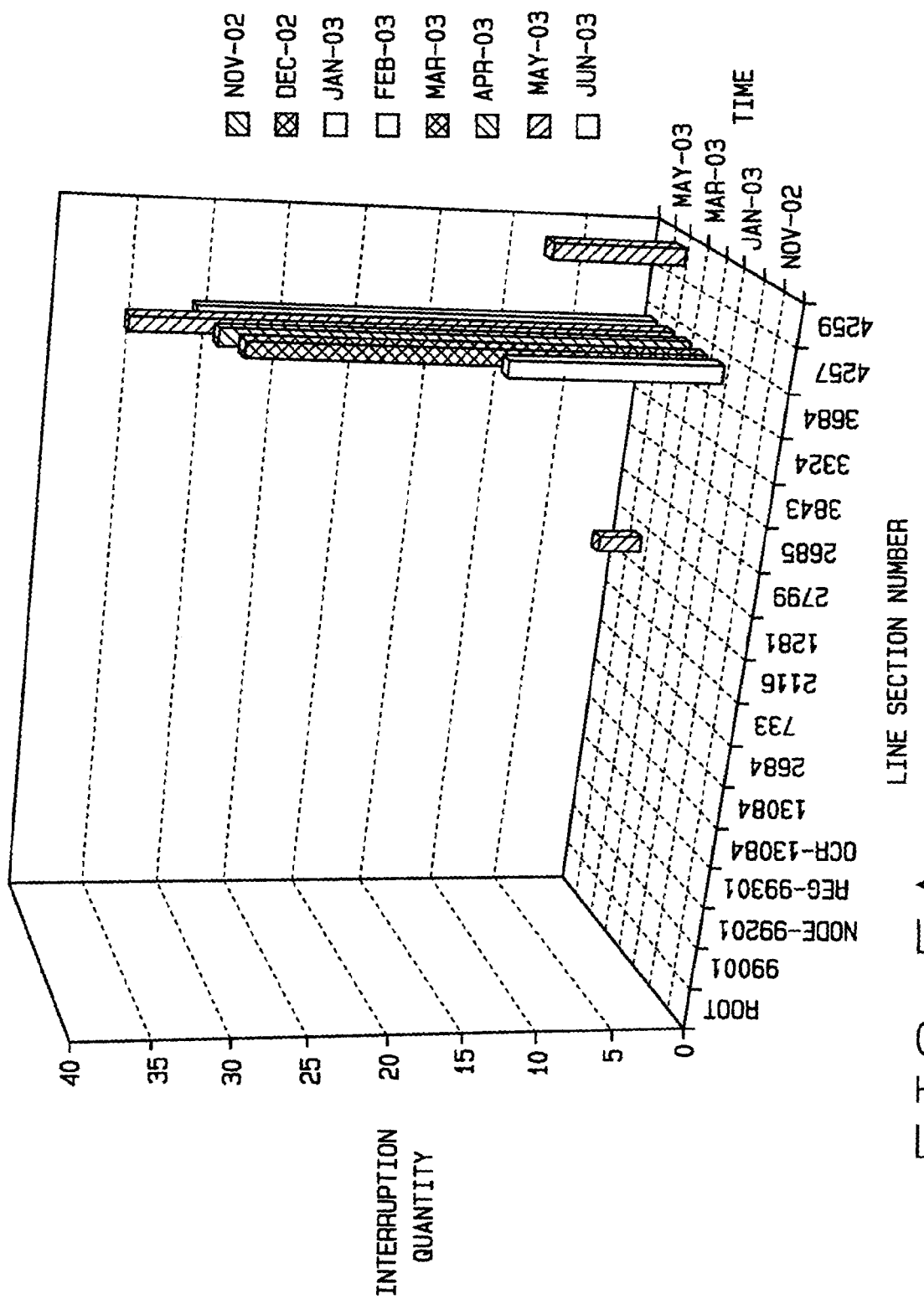
Figure 5B:
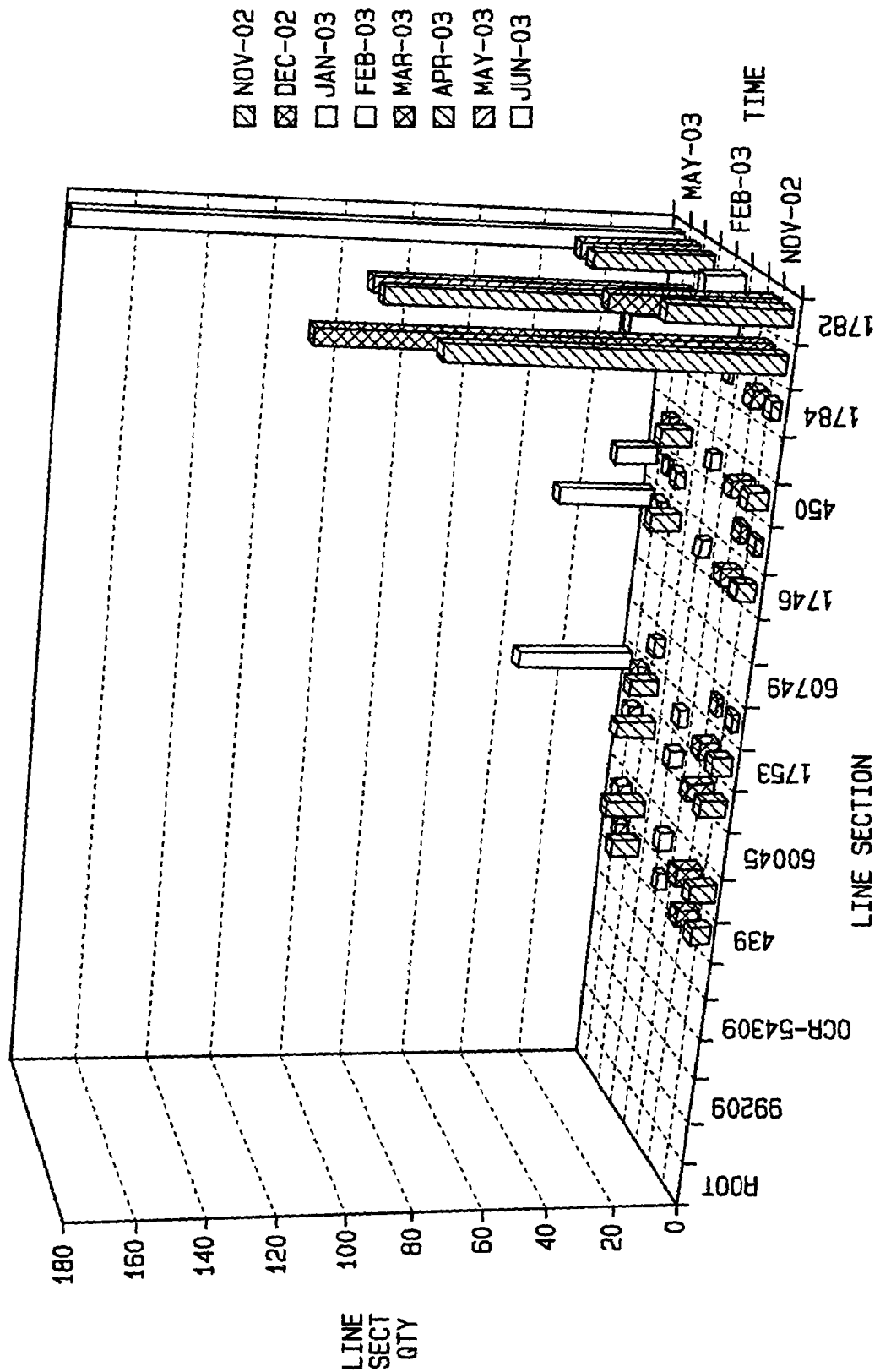

For example, FIGS. 5A and 5B are 3D displays related to blink counts occurring on certain lines within the network. FIG. 5A displays blink count (service interruption) information, gathered for defined increments of time by line section number. The display makes clear to management and service personnel that line section 3684 has a persistent problem which needs to be addressed; while, line sections 1281 and 4259 experienced something during the same time period which resulted in substantial service interruptions in those sections. However, these occurrences appear to be isolated compared with the service condition on section 3684.

FIG. 5B is similar to FIG. 5A in that it displays blink count information over time. This display, however, is for line sections having the second highest blink counts. Again, management and maintenance personnel review the display to determine where persistent problems are occurring, as well as isolated occurrences for which there may be a straightforward explanation such as a thunderstorm, transformer failure, or overload condition causing a circuit breaker to activate.

With respect to the displays of FIGS. 3A, 3B, 5A, and 5B, personnel responsible for particular line sections within the network segment have the capability to manipulate the display. As noted with respect to FIG. 3A, the display comprises part of a display loop which can be traversed to obtain desired information. With respect to this and the other displays, they can be rotated to provide a better overview of a particular section. If maintenance is concerned with possible persistent problems, they may want the display oriented so they can focus on areas within the network segment where a particular condition exceeds some acceptable level of operation.

The display also includes symbols such as the lightning bolt L shown in FIG. 3B. Use of such symbols provides a simplified method of explaining why certain conditions are represented as they are. Thus the lightning bolt indicates that the incremental quantity of incidents occurring along line sections 20–25 for the most recent reporting week is the result of a storm. Someone viewing the display could then readily understand not only what went on, but why it happened. Similarly, the inverted triangle T shown in FIG. 3B may indicate a problem such as a fallen tree limb that knocked down a power line and caused a temporary problem which has been repaired. Since the overall function of the terrain map is to illustrate the quality of service provided by the utility, these and other symbols help to focus on both short term and long term incidents so to enable management and service personnel to improve quality.

The displays shown in FIGS. 3A, 3B, 5A, and 5B can be transmitted from a regional location to a headquarters, for example, via electronic media. Or, the display can be stored in an electronic media or printed to produce hard copies for use by appropriate personnel.

Figure 4:
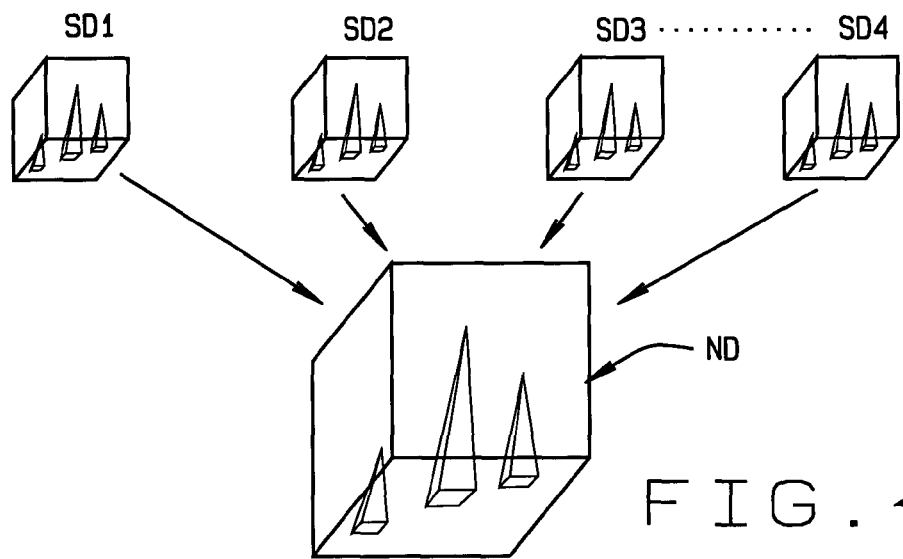
FIG. 4 illustrates providing separate graphic displays for various segments of the network to a central terminal so to provide a series of graphic displays for the entire network; and, FIGS. 5A and 5B are other representational 3D displays for a utility.

Referring to FIGS. 2 and 4, the information processed at a regional site, and/or the segment display SD, can be used, together with other, similar presentations, to provide an overall network display ND. The output from a segment data processor SDP can be sent to a network data processor NDP. There, the results are combined with those from other segment data processors to produce a combined result displayed on network display ND. The display is similar to that shown in FIG. 3B, except, for example, the x-axis of the display would now represent the occurrences for each network segment for each period of time.

More often, the separate displays SD1–SDn for each segment are transmitted to the central site for separate viewing so that management can have a section-by-section view of network performance. The combination of the individual section displays and overall system display ND provide both an overview of the total network quality of service as well a break down of quality of service by network segment. Management can then determine if weak areas of service quality reflect the results from one or two segments of the network (so that specific issues related to those segments can be addressed) or if there is a systemic problem within the network which needs to identified and rectified. Again, the network display can be stored in an electronic media for future reference.

With respect to the quality of service terrain map and the method for producing the map, the foregoing discussion has been with respect to an electrical utility. Those skilled in the art will appreciate that a quality of service display SD can be produced for other types of businesses, including other types of utilities, without departing from the scope of the invention. In each instance, the purpose of the display is to provide an overview of the quality of service and identify both short term and long term problems affecting that service.

In view of the above, it will be seen that the several objects and advantages of the present invention have been achieved and other advantageous results have been obtained.

Having thus described the invention, what is claimed and desired to be secured by Letters Patent is:

1. A method of providing a graphic display of an electrical distribution network to provide network personnel insight into network operations comprising:

monitoring a network section of the distribution network including a plurality of interconnected line segments within the network section so to obtain, in real time, end to end information of the plurality of interconnected line segments, based on network connectivity of the interconnected line segments, about a predetermined performance characteristic of the section over the interconnected line segments;

aggregating the information to ascertain relative performance characteristic values for the interconnected line segments of the section based on network connectivity of the interconnected line segments; and, displaying the results of the aggregation of the information in a graphic format which allows an observer to readily ascertain what is occurring at the respective interconnected line segments and determine whether operations within the network section are acceptable, and if not, where within the network section a problem is occurring, and the magnitude of the problem, displaying the information including a three-dimensional display in which one axis represents the interconnected line segments within the network section, a second axis a representative value of the monitored performance characteristic, and the third axis periods of time, the display providing a quality of service map for the network section.

2. The method of claim 1 in which the first axis of the display represents service paths within the interconnected line segments within the network segment.

3. The method of claim 2 further including a plurality of displays each of which comprises a terrain map including information about the network at a given point in time, the terrain maps being used to monitor and improve the quality of service within the network.

4. The method of claim 3 in which the terrain maps are arranged in a loop of maps and the method further includes a user traversing through the loop to obtain information about the quality of the network performance over time.

5. The method of claim 1 in which the display comprises a terrain map including both current and historical information about the network, the terrain map being used to monitor and improve the quality of service within the network.

6. The method of claim 5 further including rotating the display about any axis of the display to allow a viewer to readily view particular features on the terrain map.

7. The method of claim 1 in which monitoring the network section of the network includes counting customer complaints regarding problems within areas of the network section.

8. The method of claim 1 in which the monitoring further includes counting the occurrences of power outages within the network section.

9. The method of claim 8 in which the monitoring further includes measuring line voltages at the respective locations within the network.

10. The method of claim 9 including using a two-way network communications system to obtain the information about the network section.

11. The method of claim 1 further including providing a separate graphic display of multiple segments of the electrical distribution network.

12. The method of claim 11 further including combining the information used to produce the separate graphic displays to produce a graphic display for the entire network.

13. The method of claim 1 in which the information comprises a color coded, three dimensional display to facilitate understanding the information presented.

14. The method of claim 13 further including providing symbols to identify particular types of incidents which occurred at particular locations and/or particular times to facilitate interpreting the display.

15. The method of claim 13 in which the display is transmissible from one location to another by an electronic medium so the information can be displayed at more than one viewing location.

16. The method of claim 13 further including electronically storing the information used to produce the display.

17. The method of claim 13 further including periodically updating the display to include information for another predetermined period of time.

18. The method of claim 1 wherein the end to end information is free from any geographic reference relating to the monitored interconnected line segments.

19. A method of providing a graphic display of an electrical distribution network to provide network personnel insight as to network operation comprising:

monitoring a network section of a power distribution network including a plurality of interconnected line segments within the network section to obtain, in real time, end to end information of the plurality of interconnected line segments, based on network connectivity of the interconnected line segments, information about predetermined types of incidents occurring within the network section over each respective interconnected line segment;

aggregating the information to ascertain the number of incidents which occur over each respective interconnected line segment for a predetermined period of time; and, displaying the combined results in a graphic format which includes the number of incidents occurring within the network section, each interconnected line segment within the network section where they occurred, and the number of incidents which occurred for that interconnected line segment during previous periods of time, and including a three-dimensional display in which one axis represents the interconnected line segments within the network section, a second axis the number of incidents which occurred, and the third axis periods of time.

20. The method of claim 19 in which the first axis of the display represents service paths within the interconnected line segments within the network segment.

21. The method of claim 20 further including a plurality of displays each of which comprises a terrain map including information about the network at a given point in time, the terrain maps being used to monitor and improve the quality of service within the network.

22. The method of claim 21 in which the terrain maps are arranged in a loop of maps and the method further includes a user traversing through the loop to obtain information about the quality of network performance.

23. The method of claim 19 in which the display comprises a terrain map including both current and historical information about the network, the terrain map being used to monitor and improve the quality of service within the network.

24. The method of claim 23 further including rotating the display about any axis so a user can more readily view particular features on the terrain map.

25. The method of claim 19 further including color coding the display to make it easier to understand the information presented.

26. The method of claim 25 further including providing symbols to identify particular types of incidents which occurred at particular locations and/or particular times to make it easier to interpret the display.

27. A method of providing a graphic display of an electrical distribution network to provide insight into network operations comprising:

monitoring interconnected line segments of a section of the network to obtain, in real time, end to end information of the plurality of interconnected line segments current information about a predetermined performance characteristic within the interconnected line segments;

the information to ascertain relative performance characteristic values over different sections of the network section; and, displaying the results of the aggregated information in a graphic format together with historical information about the respective interconnected line segments, for an observer to readily ascertain what is occurring at a respective interconnected line segment and determine whether operations within the network are acceptable, and if not, where a problem is occurring, and the magnitude of the problem.

* * * * *